(12) United States Patent
Syvret

(10) Patent No.: US 7,416,717 B1
(45) Date of Patent: Aug. 26, 2008

(54) SYNTHESIS OF PENTAHALOSULFUR PEROXIDES AND MONOXIDES

(75) Inventor: Robert George Syvret, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/688,324

(22) Filed: Mar. 20, 2007

(51) Int. Cl.
*C01B 17/45* (2006.01)
(52) U.S. Cl. .................................. 423/511; 423/512.1
(58) Field of Classification Search ................ 423/511, 423/512.1
See application file for complete search history.

(56) References Cited

U.S. PATENT DOCUMENTS

| 3,142,537 | A | | 7/1964 | Pass et al. |
| 3,582,292 | A | * | 6/1971 | Schack et al. ............... 423/466 |
| 3,960,559 | A | | 6/1976 | Suzuki et al. |
| 3,992,208 | A | | 11/1976 | Nagata et al. |
| 6,870,068 | B1 | | 3/2005 | Lal et al. |
| 6,958,415 | B2 | | 10/2005 | Lal et al. |

FOREIGN PATENT DOCUMENTS

EP 1538144 8/2005

OTHER PUBLICATIONS

Merrill, Claude I., et al., J. Am Chem Soc., (1961), 83, p. 298.
Witucki, E. F., Inorg Nucl. Chem. Letters, (1969), vol. 5, pp. 437-440.
Gard, Gary L., Reactions of Xenon With Certain Strong Oxidizing Agents, Noble-Gas Compounds, H. H. Hyman, ed., The University of Chicago Press, Chicago, 1963, pp. 109-112.
Claude I. Merrill, et al, Some Reactions of Bis-(pentafluorosulfur) Peroxide, J. of Amer. Chem. Soc., Dept. of Chem., 85, 1963, U. of WA, Seattle, pp. 909-912.

* cited by examiner

*Primary Examiner*—Timothy C Vanoy
(74) *Attorney, Agent, or Firm*—Rosaleen P. Morris-Oskanian

(57) ABSTRACT

Provided are methods for producing pentahalosulfur peroxides and monoxides, such as bis-(pentafluorosulfur) peroxide, that involve exposing a composition comprising a pentahalosulfur hypohalite, and optionally a sulfur hexahalide or trihalomethyl hypohalite, to a halogen free radical scavenger.

37 Claims, No Drawings

SYNTHESIS OF PENTAHALOSULFUR PEROXIDES AND MONOXIDES

BACKGROUND OF THE INVENTION

This invention relates to methods for preparing peroxides and monoxides having at least one pentahalosulfur (VI) functional group. The invention further relates to novel pentahalosulfur hypohalites useful in preparing these peroxides and monoxides, and methods of producing the same.

Compounds such as bis-(pentafluorosulfur) peroxide are known to be useful as reagents for introducing an oxypentafluorosulfur group (—$OSF_5$) into an organic molecule, such as a benzene ring, by substitution or oxidative addition. (See, e.g., Claude I. Merrill, et. Al, *Some Reactions of Bis-(pentafluorosulfur) Peroxide*, Apr. 5, 1963.) The resulting organic compounds having —$OSF_5$ functionality are useful in a wide range of diverse applications such as electronics, pharmaceuticals, and polymers.

For example, bis-(pentafluorosulfur) peroxide can be reacted with benzene to form oxypentafluorosulfanylbenzene, which is useful in the synthesis of liquid crystal compositions for liquid crystal displays (LCDs). In particular, the —$OSF_5$ group of this compound imparts reduced rotational viscosity on the crystal, thereby allowing the crystal to switch faster and, in turn, improving the clarity of the LCD display. Oxypentafluorosulfanylbenzene (a.k.a. pentafluorosulfaoxybenzene) is also useful as a photodecomposable compound due to its ability to etch a silicon dioxide film coated with a fluorine-containing polymer. (See U.S. Pat. No. 3,960,559.)

Bis-(pentafluorosulfur) peroxide is also useful in synthesizing analogs of known medicinal compounds, particularly medicinal compounds comprising one or more trifluoromethyl functional groups (—$CF_3$). In particular, it is believed that substituting an oxypentafluorosulfur group for a trifluoromethyl group on a biologically active compound can improved the compound's efficacy, and in some instances, achieves new biological activity. Examples of analogs of biologically active compounds that can be synthesized with bis-(pentafluorosulfur) peroxide include a derivative of fenfluramine, such as N-ethyl-1-[3-(oxypentafluorosulfanyl)-phenyl]propan-2-amine; a derivative of fluoxetine (Prozac), such as N-methyl-3-phenyl-3-[4-(oxypentafluorosulfanyl) phenoxy]-propan-1-amine; a derivative of trifluralin, such as 2,6-dinitro-N,N-dipropyl-4-(oxypentafluorosulfanyl) aniline; and the like.

In addition, bis-(pentafluorosulfur) peroxide and similar peroxides are useful as initiators for certain polymerization reactions, such as the homopolymerization of tetrafluoroethylene. These peroxides can also form telomers with hexafluoropropene, and other fully fluorinated olefins.

Different synthesis routes have been proposed for bis(pentafluorosulfur) peroxide. For example, Merrill has suggested the catalytic reaction of $SF_5OF$ with $OSF_2$ and/or $OSF_4$ at high temperatures and pressures to produce $SF_5OOSF_5$ via the path: $SOF_2+SF_5OF \rightarrow 2\ SOF_4$; $SOF_4+SF_5OF \rightarrow SF_5OOSF_5$. (C. I. Merrill et al., *J. Am Chem. Soc.* (1961) 83, 298.)

Merrill also describes the decomposition of $SF_5OF$ via ultraviolet radiation to produce $SF_5OOSF_5$. Id. In particular, Merrill discloses that irradiating $SF_5OF$ for three hours with a 350 watt mercury vapor lamp results in a yield of approximately 25%. Merrill notes, however, that longer periods of irradiation fails to increase the yield of peroxide due to the establishment of equilibrium in the reversible reaction: 2 $SF_5OF \leftrightarrow SF_5OOSF_5+F_2$.

Witucki describes an alternative method wherein $SF_5Cl$ is reacted with $O_2$ under ultraviolet radiation to produce $SF_5OOSF_5$. (E. F. Witucki, *Inorg. Nucl. Chem. Letters* (1969) 5, 437. Another method of producing bis-(pentafluorosulfur) peroxide is described in U.S. Pat. No. 3,142,537 (Pass) wherein sulfur tetrafluoride ($SF_4$) is reacted with pentafluorosulfur hypofluorite ($SF_5OF$) in the absence of oxygen.

Notwithstanding the synthesis methods described above, there remains a need for improved methods for producing pentahalogenatedsulfur oxides, such as methods for economically and efficiently producing bis-(pentafluorosulfur) peroxide in high yields. The present invention satisfies the need for such processes.

BRIEF SUMMARY OF THE INVENTION

Applicants have discovered novel methods for synthesizing compounds having pentahalosulfur (VI) functionality including (a) symmetrical and/or asymmetrical peroxides and monoxides having terminal pentahalosulfur (VI) functionality, and (b) pentahalosulfur hypohalites.

As used herein, the terms dihalogen, tetrahalogen, tetrahalo-, tetrahalide, pentahalogen, pentahalo-, pentahalide, hexahalogen, hexahalo-, hexahalide, and the like, mean a substance, such as a molecule, having the indicated number of halogen atoms, although each halogen of the substance may or may not be the type of halogen. For example, a dihalogen could be $F_2$, $Cl_2$, FCl, and the like; a pentahalosulfur hypofluorite could be $SFCl_4OF$, $SF_2Cl_3OF$, $SF_3Cl_2OF$, $SF_4ClOF$, $SF_5OF$, and the like; etc.

Accordingly, an aspect of the present invention provides methods for forming symmetrical and asymmetrical peroxides and monoxides having terminal pentahalosulfur (VI) functionality, such as bis-(pentafluorosulfur) peroxide, which are useful, for example, as reagents in the production of organic compounds having oxypentahalosulfur functionality.

A preferred embodiment of this aspect of the invention involves reacting a compound comprising one or more pentahalosulfur hypohalites while the compound is exposed to at least one halogen radical scavenger. Preferably, the pentahalosulfur hypohalites are of Formula (I):

where X is —F or —Cl and Y is independently selected from —F and —Cl.

It is contemplated, therefore, that Formula (I) in its broad aspects covers compounds such as $FOSF_5$, $ClOSCl_5$, $FOSCl_2F_3$, and the like. In certain highly preferred embodiments, each Y is fluorine—i.e., preferred compounds of Formula (I) include pentafluorosulfur hypofluorite and pentafluorosulfur hypochlorite.

In certain embodiments of the present invention, the methods comprise reacting a first compound of Formula (I) with a second compound of Formula (I) in the presence of at least one halogen radical scavenger to form a peroxide. Preferably, the first and second compounds have the same structure, i.e. the first and second compounds are the same substance. More preferably, the first and second compounds have pentafluorosulfur functionality. A preferred product of such reaction is bis-(pentafluorosulfur) peroxide.

In certain other embodiments, the methods comprise reacting a first compound of Formula (I) with a second compound of Formula (II):

where each Y is independently —F, —Cl, —Br, or —I, provided that all Y's are not the same type of halogen, in the presence of at least one halogen radical scavenger to form a monoxide. Preferably at least five of the Y's are —F, —Cl, or some combination thereof. Preferred examples of $SY_6$ include $SF_5Cl$, $SF_5Br$, and $SCl_5Br$. Certain preferred methods comprise reacting at least one compound of Formula (I) having sulfur pentafluoride functionality, such as pentafluorosulfur hypofluorite and/or pentafluorosulfur hypochlorite, with at least one compound of Formula (II). More preferably, pentafluorosulfur hypofluorite and/or pentafluorosulfur hypochlorite is reacted with a compound of Formula (II) having pentafluorosulfur functionality, such as $SF_5Cl$, to produce a bis-(pentafluorosulfur) monoxide.

In certain other embodiments, the methods comprise reacting a first compound of Formula (I) with a second compound of Formula (III):

where X' is selected from —F and —Cl and R is a trihalomethyl (i.e., —CY'$_3$ wherein Y' is a halogen). Preferably R is —CF$_3$ in the presence of at least one halogen radical scavenger to form an asymmetrical peroxide. A preferred product of this reaction is an asymmetrical peroxide having the formula ROOSY$_5$.

The methods for producing symmetrical and/or asymmetrical peroxides and monoxides that are taught herein are advantageous in that they tend to consume halogen radicals and, thus, tend to substantially shift a reversible reaction equilibrium that may be present. The shifting of this reversible equilibrium, when present, allows for increased yield of the desired peroxide or monoxide product. Moreover, in certain of such embodiments, reaction byproducts exist in a different physical state than the desired product at moderate temperatures and pressures and, therefore, the product and byproducts can be easily and economically separated.

DETAILED DESCRIPTION OF THE INVENTION

Preferred methods for forming peroxides and monoxides in accordance with the present invention comprise reacting at least one pentahalosulfur hypohalite in the presence of at least one halogen radical scavenger. Preferably, the pentahalosulfur hypohalite is a pentahalosulfur hypofluorite and/or a pentahalosulfur hypochlorite. Examples of preferred pentahalosulfur hypohalite include $SF_5OF$, $SF_5OCl$, $SF_4ClOF$, $SF_4ClOCl$, $SF_3Cl_2OF$, $SF3Cl_2OCl$, $SF_2Cl_3OF$, $SF_2Cl_3OCl$, and $SCl_5OCl$, with $SF_5OF$ and $SF_5OCl$ being particularly preferred.

Certain pentahalosulfur hypohalites, such as $SF_5OF$ and $SF_5OCl$ are commercially available or can be synthesized by known techniques. It is believed that skilled artisans can synthesize other pentahalosulfur hypohalites, such as $SF_4ClOF$, $SF_4ClOCl$, $SF_3Cl_2OF$, $SF_3Cl_2OCl$, $SF_2Cl_3OF$, $SF_2Cl_3OCl$, $SFCl_4OF$, $SFCl_4OCl$ and $SCl_5OCl$ by known techniques. For example, tetrahalosulfoxides compounds having the structure of Formula (VIII):

wherein X" is independently selected from F and Cl (e.g., $OSCl_4$, $OSCl_3F$, $OSCl_2F_2$, and $OSClF_3$) can likely be reacted with $F_2$, $Cl_2$, or FCl in the presence of a halogen ion catalyst, such as CsF or CsCl, to form a pentahalosulfur hypohalites.

Applicants have found that heating and pressurizing and/or irradiating a composition of one or more pentahalosulfur hypohalites, preferably pentafluorosulfur hypohalites, and at least one halogen radical scavenger leads to the formation of compounds of the Formula (IV):

where each Y is as indicated above. In certain preferred embodiments the composition comprises only one type of pentahalosulfur hypohalite. In particularly preferred embodiments, the compound produced by the present invention comprises bis-(pentafluorosulfur) peroxide ($SF_5OOSF_5$).

It is believed that heating and pressurizing and/or irradiating a composition of at least one pentahalosulfur hypohalite, preferably a pentafluorosulfur hypohalite, at least one sulfur hexahalide having at least two different types of halogen atoms, and at least one halogen radical scavenger leads to the formation of compounds of the Formula (V):

where each Y is as indicated above. In certain preferred embodiments, the compound produced by the present invention comprises bis-(pentafluorosulfur) monoxide ($SF_5OSF_5$).

Thus, in certain embodiments of the invention, and particularly those in which $SF_5OOSF_5$ or $SF_5OSF_5$ is a desired product, the method comprises reacting a first compound having the formula $SF_5OX$ with a second compound according to Formulae I or II wherein the second compound comprises an —$SF_5$ group, in the presence of a halogen radical scavenger to form at least one product having a structure selected from $SF_5OOSF_5$ and $SF_5OSF_5$.

Of these embodiments, those that are particularly useful for producing $SF_5OOSF_5$ utilize a second compound having the formula $SF_5OX$, wherein X is —F or —Cl. More preferably, the first and second compounds both have the formula $SF_5OCl$ or $SF_5OF$, with $SF_5OF$ being the more preferred due to the ability of certain fluoride radical scavengers, such as xenon, to react with fluoride radicals to form a stable solid precipitate byproduct.

The embodiments that are particularly useful for producing $SF_5OSF_5$ utilize $SF_5Cl$ and/or $SF_5Br$ as the second compound. $SF_5Br$ is advantageous as a second compound due to is easy degradation into an .$SF_5$ radical and a bromine radical. $SF_5Cl$ is also especially advantageous as a second compound when used in combination with certain radical scavengers, such as xenon, due to xenon's ability to form a metastable $XeCl_2$ byproduct which subsequently breaks down into Xe and $Cl_2$. Since both Xe and $Cl_2$ exist in a gaseous state at moderate temperatures and pressures, and consequently can be relatively easily separated from the desired product. Moreover, since the xenon in this embodiment is not consumed in the process, it effectively functions as a catalyst.

It is further believed that heating and pressurizing and/or irradiating a composition of at least one pentahalosulfur hypohalite, preferably a pentafluorosulfur hypohalite; at least one trihalomethyl hypohalites or halosulfate hypohalites; and at least one halogen radical scavenger leads to the formation of asymmetrical compounds of the Formula (VI):

wherein R and Y are as indicated above.

In certain other embodiments, particularly those in which an asymmetrical pentafluorosulfur peroxide product is desired, the method comprises reacting a first compound having the formula $XOSF_5$ with a second compound having the formula X'OR in the presence of a radical halogen scavenger to yield a product having the formula $F_5SOOR$, wherein X and X' are independently —F or —Cl; and R is —$CF_3$. For example, embodiments that utilize $CF_3OF$ as a second compound result in the formation of the asymmetrical peroxide $SF_5OOCF_3$.

Although not wishing to be bound by any particular theory, it is believed that the methods of this invention involve a free radical addition reaction. By way of example, it is believed that subjecting a pentahalosulfur hypohalite, and particularly a pentafluorosulfur hypohalite, such as $SF_5OF$ or $SF_5OCl$, to heat and pressure and/or to UV radiation in the presence of a halogen radical scavenger leads to the disassociation of the pentahalosulfur hypohalite molecules into halogen free radicals (e.g., F. or Cl.) and $SY_5O$. free radicals, such as $SF_5O$. free radicals. The halogen radicals combine with the halogen radical scavenger, preferably as a stable or metastable byproduct, and pairs of the $SY_5O$. free radicals combine to form the peroxide $SY_5OOSY_5$, and particularly $SF_5OOSF_5$. If the reaction mixture composition comprising, for example, $SF_5O$. radicals further comprises other free radicals such as $.SF_5$ or $.OCF_3$, the $SF_5O$. radicals will combine with these other free radicals to form monoxides or asymmetrical peroxides.

The formation of $SY_5O$. free radicals, such as $SF_5O$. free radicals, from a heated and pressurized or irradiated reaction mixture composition comprising a pentahalosulfur hypohalite and a halogen radical scavenger is believed to be not readily predictable based solely on known chemical reaction principles. In certain preferred embodiments of the present invention a reaction mixture composition comprising pentahalosulfur hypohalite, such as pentafluorosulfur hypohalite, and a halogen radical scavenger are maintained at a temperature of from about 150° C. to about 250° C., more preferably from about 165° C. to about 175° C., and a pressure of from about 30 psig to about 120 psig, more preferably from about 40 psig to about 100 psig. In certain preferred embodiments the reaction mixture is maintained within these preferred temperature and pressure conditions for a duration of from about 1 day to about 10 days, more preferably from about 5 to about 6 days.

In certain other embodiments, the reaction mixture composition comprising pentahalosulfur hypohalite and a halogen radical scavenger is preferably maintained at a temperature of from about 150° C. to about 250° C., more preferably from about 165° C. to about 175° C., and a pressure of about 750 psig to about 1500 psig, more preferably from about 800 psig to about 1200 psig. In such embodiments it is generally preferred for the reaction mixture to be maintained under these conditions for a duration of from about 2 hours to about 20 hours, more preferably from about 12 to about 16 hours.

Alternatively, or in addition to heat and pressure, the present methods comprise exposing a composition to ultraviolet (UV) radiation, said composition comprising pentahalosulfur hypohalite and a halogen radical scavenger. In certain preferred embodiments, the reaction mixture composition is exposed to a UV light source (e.g., a photolysis chamber containing 16 UV light bulbs, each emitting 35 W of power at a wavelength of about 190 nm). In a particularly preferred embodiments, the UV exposing step comprises exposing the reaction mixture composition to UV radiation (190 nm) at about ambient temperature and at a pressure of from about 3 to about 15 psig, more preferably from about 5 to about 10 psig, preferably for a duration of from about 1 to about 10 hours, more preferably from about 4 to about 5 hours.

It is believed that the preferred reaction conditions specified herein are effective, at least in part, because such conditions promote the formation of $SY_5O$. radicals, and in preferred embodiments $SF_5O$. radicals. Moreover, the above-mentioned preferred temperature, pressure, and duration conditions also are believed to be generally effective for producing $.SY_5$ free radicals, and in preferred embodiments $.SF_5$ free radicals from $YSF_5$ where Y is a halogen other than F, such as $SF_5Cl$ and $SF_5Br$. Such preferred reaction conditions are also believed to be generally effective for producing $.OCY_3$ free radicals, such as $.OCF_3$ from trihalomethyl hypohalites.

As indicated above, in certain preferred embodiments $SF_5O$. radicals are produced from a reaction mixture composition comprising a pentafluorosulfur hypohalite and a halogen radical scavenger. It is believed that as the pentafluorosulfur hypohalite disassociates, the halogen radical scavenger removes halogen radicals from the composition, thereby substantially reducing any reversal of the disassociation. Preferably, the selection of the halogen radical scavenger corresponds to the specific halogen radical formed via disassociation. That is, if the hypohalite of the composition is —OF, a fluorine radical will be produced and the corresponding halogen radical scavenger is preferably a scavenger having an affinity for fluorine radicals. Examples of preferred fluoride radical scavengers include Xe, $CoF_2$, $MnF_3$, $CeF_3$, CO, $SO_2$, metal hydrides, and the like. Similarly, if the hypohalite of the composition is —OCl, a chlorine radical will be produced and the corresponding halogen radical scavenger is preferably a scavenger having an affinity for chlorine radicals. Examples of preferred chlorine radical scavengers include CO, $SO_2$, and metal halides.

Some halogen radical scavengers, such as CO, have an affinity for both F. and Cl. radicals and, therefore, are useful when the present invention comprises a composition having a mixture of hypohalites, such as a mixture of sulfur pentafluoride hypofluoride and sulfur pentafluoride hypochloride. Alternatively, a mixture of halogen radical scavengers may be used when more than one type of halogen radical is present in the composition. For example, reaction mixtures comprising sulfur pentafluoride hypofluoride and sulfur pentafluorobromide will, according to preferred embodiments, yield both fluorine and bromine radicals. Preferred halogen radical scavengers for such a reaction mixture include both fluorine radical scavengers, such as those indicated above, and bromine radical scavengers, such as zinc, copper, magnesium, and the like.

Particularly preferred radical scavengers are those which react with the halogen radicals to form a reaction byproduct that exists in a different physical state than the desire peroxide or monoxide product at or about the conditions existent in the reaction product, or at conditions which are relatively economical to achieve, for example when the reaction product and byproduct are at a moderate temperatures and pressures. As used herein, the term "moderate temperature and pressure" means a temperature and pressure that can be safely produced in a laboratory or industrial workplace without extraordinary cost or precautions—for example, a temperature from about −5° C. to about 40° C. and a pressure from about 0 psia to about 25 psia.

Examples of such byproducts include those compounds having a formula selected from the group consisting of $ZF_n$, $ZCl_n$, $F_2$, and $Cl_2$, wherein Z is an atom or molecule, or a portion of a molecule, which comprises the halogen radical scavenger and n is a positive integer that is equal to at least one oxidation state of Z. In a particularly preferred embodiment, $SF_5OF$ is reacted in the presence of Xe to form the peroxide product $SF_5OOSF_5$ (which exists as a liquid at 0° C. and ambient pressure) and the byproduct $XeF_2$ (which exists as a solid at 0° C. and ambient pressure).

EXAMPLES

Certain aspects of the present invention are further illustrated, but are not limited by, the following examples.

Example 1

This example demonstrates a method for preparing $SF_5OOSF_5$ from a composition of $SF_5OF$ and Xe by maintaining the composition at high temperatures and high pressures for at least five days.

A reaction mixture is formed from approximately 14.8 g (91.3 mmol) of $SF_5OF$ and about 6 g (45.7 mmol) of Xe and is condensed into a 600-cc Monel stirred reactor. The condensed reaction mixture is stirred and heated to approximately 167° C. and 95 psig. The reaction mixture is maintained between about 167 and 170° C. for greater than about 5 days but less than about 6 days. Over the 5+ day reaction period the internal pressure in the reaction vessel decreases from about 95 psig (initially) to about 42 psig. The contents are then cooled to ambient temperature.

The contents of the reactor are then pumped through first and second U-tube traps cooled to about −78° C. and about −196° C., respectively, to remove volatile components from the reaction product. After the reactor contents have been pumped through the two traps, the −78° C. trap is warmed to about 0° C. whereupon it contains a mixture of a white solid and a colorless liquid. The liquid is removed, mixed with $CFCl_3$, and analyzed by $^{19}F$ NMR spectroscopy. The analysis is consistent with $SF_5OOSF_5$ ($AB_4$ spin pattern: $\delta^{19}F_A$=57.5 ppm, area=0.66 units; $\delta^{19}F_B$=56.0 ppm, area=2.82 units). The white solid, which is highly crystalline in appearance, is confirmed to be pure $XeF_2$ by comparison of its Raman spectrum (recorded with 532 nm excitation @ 5 mW) with that of an authenticated sample of $XeF_2$.

Example 2

This example demonstrates a method for preparing $SF_5OOSF_5$ from a composition of $SF_5OF$ and Xe by maintaining the composition at high temperatures and very high pressures for less than about 1 day.

A reaction mixture is formed by condensing approximately 27.6 g (170.3 mmol) of $SF_5OF$ and 13.7 g (104 mmol) of Xe into a 600-cc Monel stirred reactor. The condensed composition is stirred and heated to approximately 167° C. and about 1,100 psig. The mixture is maintained at about 168-169° C. for about 14 hours. Over the 14 hour reaction period, the internal pressure decreases from about 1,100 psig to about 890 psig. After the specified time the reactor and contents are cooled to ambient temperature and subsequently the reactor contents are pumped through first and second U-tube traps, cooled to about −106° C. and about −196° C., respectively, to remove volatiles. The volatiles of the −196° C. trap contents are stored for future use. The contents of the −106° C. trap are warmed to about 0° C. and are found to contain a mixture of a white solid and a colorless liquid weighing about 8.0 g. A portion of the liquid is removed, mixed with $CFCl_3$ and analyzed by $^{19}F$ NMR spectroscopy. The analysis is consistent with $SF_5OOSF_5$ ($AB_4$ spin pattern: $\delta^{19}F^A$=56.9 ppm, area=43.29 units; $\delta^{19}F_B$=55.4 ppm, area=170.93 units). After removing the initial volatile contents of the reactor at ambient temperature, the reactor is heated to about 100° C. and pumped on through a trap cooled to about −196° C. After 30 minutes, a white crystalline solid (5.8 g) has collected in the trap. The white solid, which is highly crystalline in appearance, is confirmed to be pure $XeF_2$ by comparison if its Raman spectrum with that of an authenticated sample of $XeF_2$.

The volatiles collected from the second trap are condensed back into the reactor together with fresh $SF_5OF$ (16.3 g, 101 mmol) and the contents are heated to about 168° C. for about 19 hours. After the specified time, the reaction products are fractionated through low-temperature U-tube traps cooled to about −106° C. and about -196° C. The −106° C. trap contained about 8.1 g of a solid and liquid mixture. The liquid is decanted and combined with the previously collected liquid portion to give a total of 13.0 g (45 mmol) of $SF_5OOSF_5$ product.

Example 3

This example demonstrates that $SF_5OOSF_5$, prepared in accordance with certain embodiments of the present invention, is sufficiently pure to use as a source of $SF_5O$. in aromatic addition reactions.

The 13.0 g combined product obtained from Example 2 is subsequently reacted with benzene (46 mmol) at about 150° C. for about 16 hours, resulting in near-quantitative formation of $C_6H_5OSF_5$, indicating that the 13.0 g of $SF_5OOSF_5$ is sufficiently pure for its subsequent intended use as a radial source of $OSF_5$ in aromatic addition reactions, exemplified by the benzene reaction described in U.S. patent application Ser. No. 11/484,226.

Example 4

This example demonstrates a method for preparing $SF_5OOSF_5$ from a composition of $SF_5OF$ and Xe by exposing a reaction mixture in accordance with the present invention to UV radiation.

A circulating photolysis system comprising a quartz photolysis cell inside a UV light source (190 nm) chamber, a circulating pump, and a FEP U-tube is charged with 261.6 Torr Xe and 504.6 Torr $SF_5OF$ The mixture is irradiated for 3.5 hours while being circulated. The FEP U-tube is then cooled to −78° C. resulting in collection of 0.6 g of a liquid/solid mixture. A portion of this mixture is mixed with $CH_2Cl_2$/$CDCl_3$ and analyzed by $^{19}F$ NMR spectroscopy. The NMR spectrum indicated a predominance of $SF_5OOSF_5$ ($AB_4$ pattern between 56 and 58 ppm) with much lesser amounts of —$SF_x$ containing impurities. The remainder of the reaction mixture is combined with the reaction mixture of $SF_5OOSF_5$ obtained from another UV experimental run and the resulting mixture is irradiated for 6 hours while circulating through the FEP U-tube which is cooled to 0° C. After the specified time, the U-tube has collected 3.8 g of product, which consists mostly of a white crystalline solid with a small amount of liquid. Analysis of the liquid and solid confirms them to be the expected products $SF_5OOSF_5$ and $XeF_2$.

Having thus described a few particular embodiments of the invention, it will be apparent to those skilled in the art, in view of the teachings contained herein, that various alterations, modifications, and improvements not specifically described are available and within the scope of the present invention. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method for producing a bis-(pentafluorosulfur) peroxide or monoxide comprising reacting, in the presence of at least one halogen radical scavenger, a first compound having the formula $SF_5OX$ with a second compound having the formula selected from $SF_5OX'$ and $SF_5Y$, wherein X and X' are independently selected from —F and —Cl and Y is selected from —Cl or —Br, to form a reaction product having the formula $SF_5(O)_nSF_5$, wherein n is 1 or 2.

2. The method of claim 1 wherein the second compound is $SF_5OX'$ and said reaction product comprises $SF_5OOSF_5$.

3. The method of claim 2 wherein X and X' are —F and said at least one halogen radical scavenger comprises at least one fluorine radical scavenger.

4. The method of claim 3 wherein said at least one fluorine radical scavenger is selected from the group consisting of Xe, $CoF_2$, $MnF_3$, $CeF_3$, CO, $SO_2$, metal hydrides, and two or more of these.

5. The method of claim 4 wherein said at least one fluorine radical scavenger comprises Xe.

6. The method of claim 2 wherein X is —Cl and said at least one halogen radical scavenger comprises at least one chlorine radical scavenger.

7. The method of claim 6 wherein said at least one chlorine radical scavenger is selected from the group consisting of CO, $SO_2$, metal halides, and two or more of these.

8. The method of claim 1 wherein said second compound is $SF_5Br$ and said product comprises $SF_5OSF_5$.

9. The method of claim 1 wherein said second compound is $SF_5Cl$ and said product comprises $SF_5OSF_5$.

10. The method of claim 9 wherein said first compound is $SF_5OF$ and said at least one radical halogen scavenger comprises CO.

11. The method of claim 9 wherein said first compound is $SF_5OCl$ and said at least one radical halogen scavenger is selected from the group consisting of CO, $SO_2$, metal halides, and two or more of these.

12. The method of claim 1 wherein said reacting step produces a reaction product further comprising at least one byproduct having a formula selected from the group consisting of $ZF_n$, $ZCl_n$, $F_2$, ClF, BrCl, BrF, and $Cl_2$,
wherein Z is an atom or molecule contained in said at least one halogen radical scavenger, and
n is a positive integer that is equal to at least one oxidation state of Z.

13. The method of claim 12 wherein said byproduct is present in a physical state that is different from said product.

14. The method of claim 13 wherein said byproduct is a solid and said product is a liquid.

15. The method of claim 14 wherein said first and second compounds are $SF_5OF$ said halogen radical scavenger is Xe, said product comprises $SF_5OOSF_5$, and said byproduct comprises $XeF_2$.

16. The method of claim 13 wherein said byproduct is a gas and said product is a liquid.

17. The method of claim 13 wherein said first compound is $SF_5OCl$, said second compound is $SF_5Cl$, said halogen radical scavenger is Xe, said product comprises $SF_5OSF_5$, and said byproduct comprises a combination of Xe and $Cl_2$.

18. The method of claim 1 wherein said reacting step comprises:
forming a reaction mixture comprising said first and said second compounds, and
maintaining said reaction mixture at a temperature of from 150° C. to 250° C. and at a pressure of from 40 psig to 1500 psig for a period sufficient to form said product.

19. The method of claim 18 wherein said pressure is from 40 psig to 100 psig and period is from 1 day to 10 days.

20. The method of claim 18 wherein said pressure is from 750 psig to 1500 psig and said period is from 1 hour to 20 hours.

21. The method of claim 1 wherein said reacting step comprises forming a reaction mixture comprising said first and said second compounds and exposing said reaction mixture to UV radiation under conditions effective to form said product.

22. The method of claim 21 where said conditions effective comprise exposing said reaction mixture to said UV radiation for a period of from 1 hour to 10 hours.

23. A method for producing a nonsymmetrical pentafluorosulfur peroxide comprising reacting a first compound having the formula $XOSF_5$ with a second compound having the formula X'OR in the presence of a halogen radical scavenger to form a product having the formula $F_5SOOR$,
wherein X and X' are independently —F or —Cl; and
R is $CY'_3$ wherein Y' is a halogen.

24. The method of claim 23 wherein said halogen radical scavenger comprises Xe.

25. The method of claim 24 wherein X and X' are —F and R is $CF_3$.

26. A method of forming an at least one pentahalogenated sulfur oxide compound comprising:
(a) providing at least one halogen radical scavenger; and
(b) reacting, in the presence of said halogen radical scavenger,
a first compound of Formula (I):

$$XOSY_5 \qquad (I),$$

with a second compound chosen from
a compound of Formula (I),
a compound of Formula (II):

$$SY'_6 \qquad (II), \text{ and}$$

a compound of Formula (III):

$$ROX' \qquad (III),$$

wherein
X is independently selected from —F and —Cl,
X' is independently selected from —F and —Cl,
Y is independently selected from —F and —Cl,
Y' is independently selected from the group consisting of —F, —Cl, —Br, and —I, provided that not all Y's are the same type of halogen and
R is independently a trihalomethyl group
under conditions effective to produce the at least one pentahalogenated sulfur oxide compound.

27. The method of claim 26 wherein each Y is —Cl.

28. The method of claim 26 wherein each Y is —F.

29. The method of claim 26 wherein the first compound of Formula (I) comprises pentafluorosulfur hypofluorite.

30. The method of claim 26 wherein the first compound of Formula (I) comprises pentafluorosulfur hypochlorite.

31. The method of claim 26 wherein said second compound comprises the compound of Formula (I).

32. The method of claim 26 wherein said second compound comprises the compound of Formula (II).

33. The method of claim 32 wherein five Y's of said second compound of Formula (II) are the same type of halogen.

34. The method of claim 33 wherein said second compound of Formula (II) has a pentafluorosulfur functionality.

35. The method of claim 34 wherein said second compound of Formula (II) comprises $SF_5Cl$.

36. The method of claim 26 wherein said second compound comprises the compound of Formula (III).

37. The method of claim 36 wherein said second compound of Formula (III) comprises $CF_3$.

* * * * *